(12) United States Patent
Zhang et al.

(10) Patent No.: US 10,585,812 B2
(45) Date of Patent: Mar. 10, 2020

(54) MULTI-STANDARD SINGLE INTERFACE WITH REDUCED I/O COUNT

(71) Applicant: Intel Corporation, Santa Clara, CA (US)

(72) Inventors: Chunyu Zhang, Folsom, CA (US); Kevin E. Arendt, Folsom, CA (US); Hongjiang Song, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 15/085,839

(22) Filed: Mar. 30, 2016

(65) Prior Publication Data

US 2017/0286327 A1 Oct. 5, 2017

(51) Int. Cl.
*G06F 13/10* (2006.01)
*G06F 13/40* (2006.01)

(52) U.S. Cl.
CPC ........ *G06F 13/102* (2013.01); *G06F 13/4068* (2013.01)

(58) Field of Classification Search
CPC ............................ G06F 13/102; G06F 13/4068
See application file for complete search history.

(56) References Cited

U.S. PATENT DOCUMENTS

| | | |
|---|---|---|
| 6,531,896 B1 | 3/2003 | Song |
| 6,639,956 B1 | 10/2003 | Song |
| 2009/0049206 A1 | 2/2009 | Olschner et al. |
| 2014/0006649 A1 | 1/2014 | Wiley et al. |
| 2014/0055163 A1 | 2/2014 | Song |
| 2014/0270005 A1 | 9/2014 | Sengoku et al. |
| 2014/0281108 A1 | 9/2014 | Pethe et al. |
| 2017/0019186 A1* | 1/2017 | Wiley .................. H04B 10/801 |

OTHER PUBLICATIONS

MIPI C-PHY and D-PHY /D Universal IP, MXL-CPHY-DPHY-UNIV-U-040LP, Mixil, Inc., www.mixel.com, Feb. 29, 2016, , pp. 1.
International Search Report and Written Opinion for PCT Patent Application No. PCT/US2017/013038, dated Apr. 26, 2017 , 9 pages.

* cited by examiner

*Primary Examiner* — Zachary K Huson
(74) *Attorney, Agent, or Firm* — Compass IP Law PC

(57) ABSTRACT

An apparatus is described having an electrical interface that supports a first specification and a second specification. The first specification specifies differentially transmitted data. The second specification specifies at least three transmitted data signals. The electrical interface includes a plurality of modular transmitter circuits where each transmitter circuit includes a single ended driver and a select circuit. The select circuit is to select either one end of a differential signal associated with the first specification or one of the at least three transmitted data signals associated with the second specification.

20 Claims, 10 Drawing Sheets

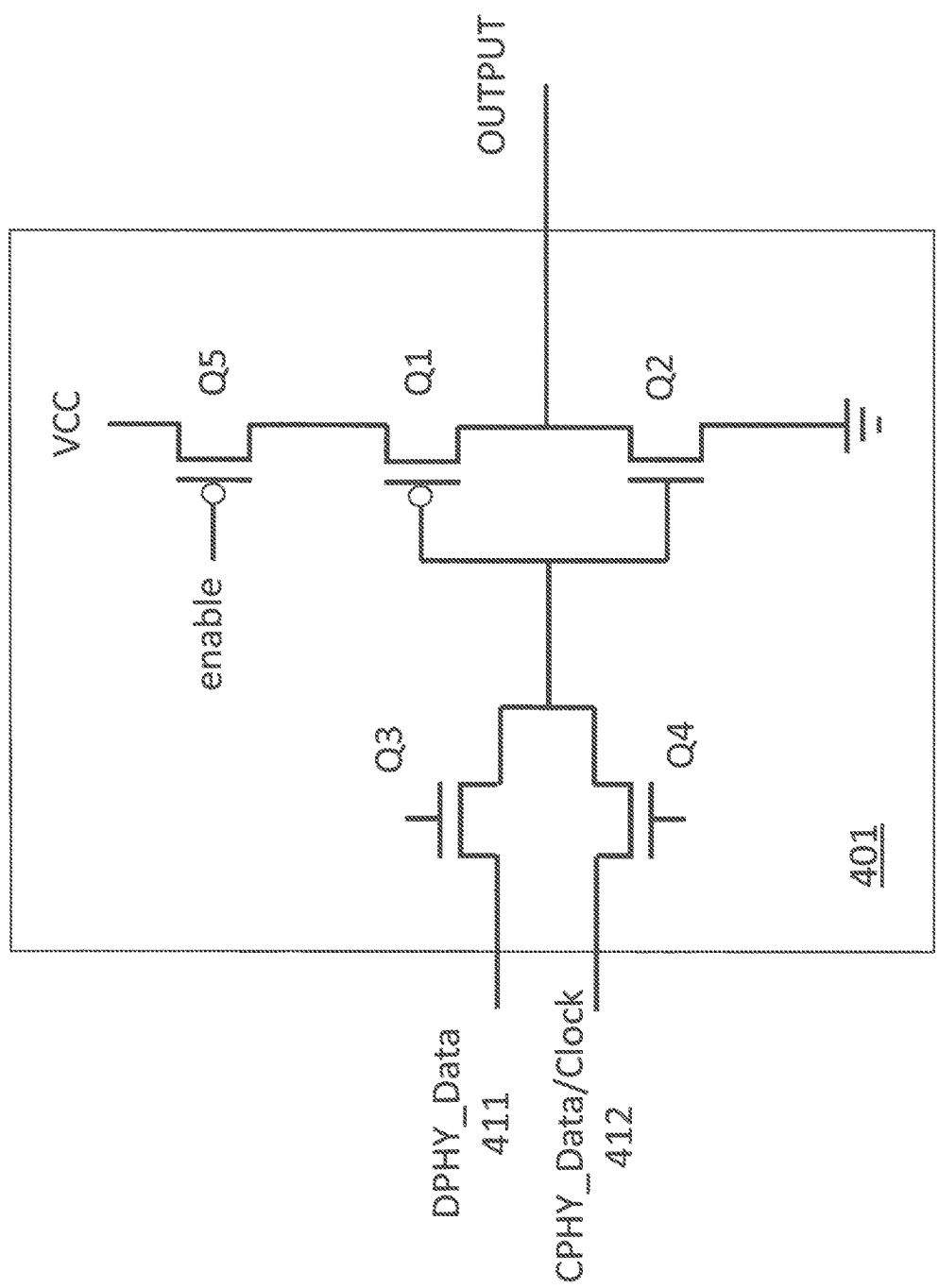

MULTI-STANDARD SINGLE INTERFACE WITH REDUCED I/O COUNT

BACKGROUND

With the ever increasing density and complexity of integrated circuits, there is a multitude of electrical interfaces defined by an industry standard specification that a semiconductor chip is expected to support. Additionally, again with the ever increasing density and complexity of integrated circuits it is difficult to keep the number of I/Os of a semiconductor chip within feasible limits. As such, there is a motivation to support multiple interfaces through only a few I/Os.

FIGURES

Figure 1:
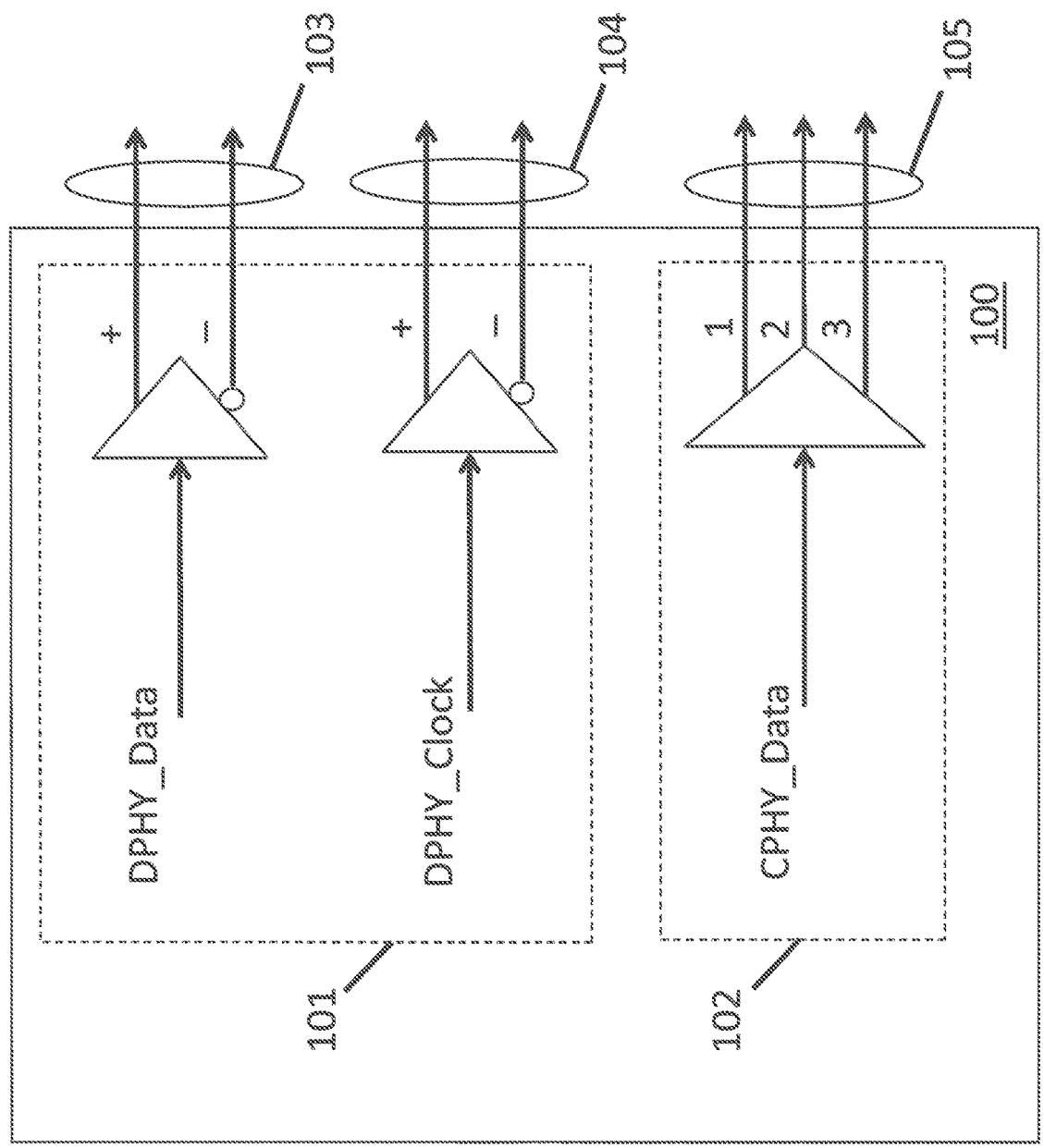
Figure 2:
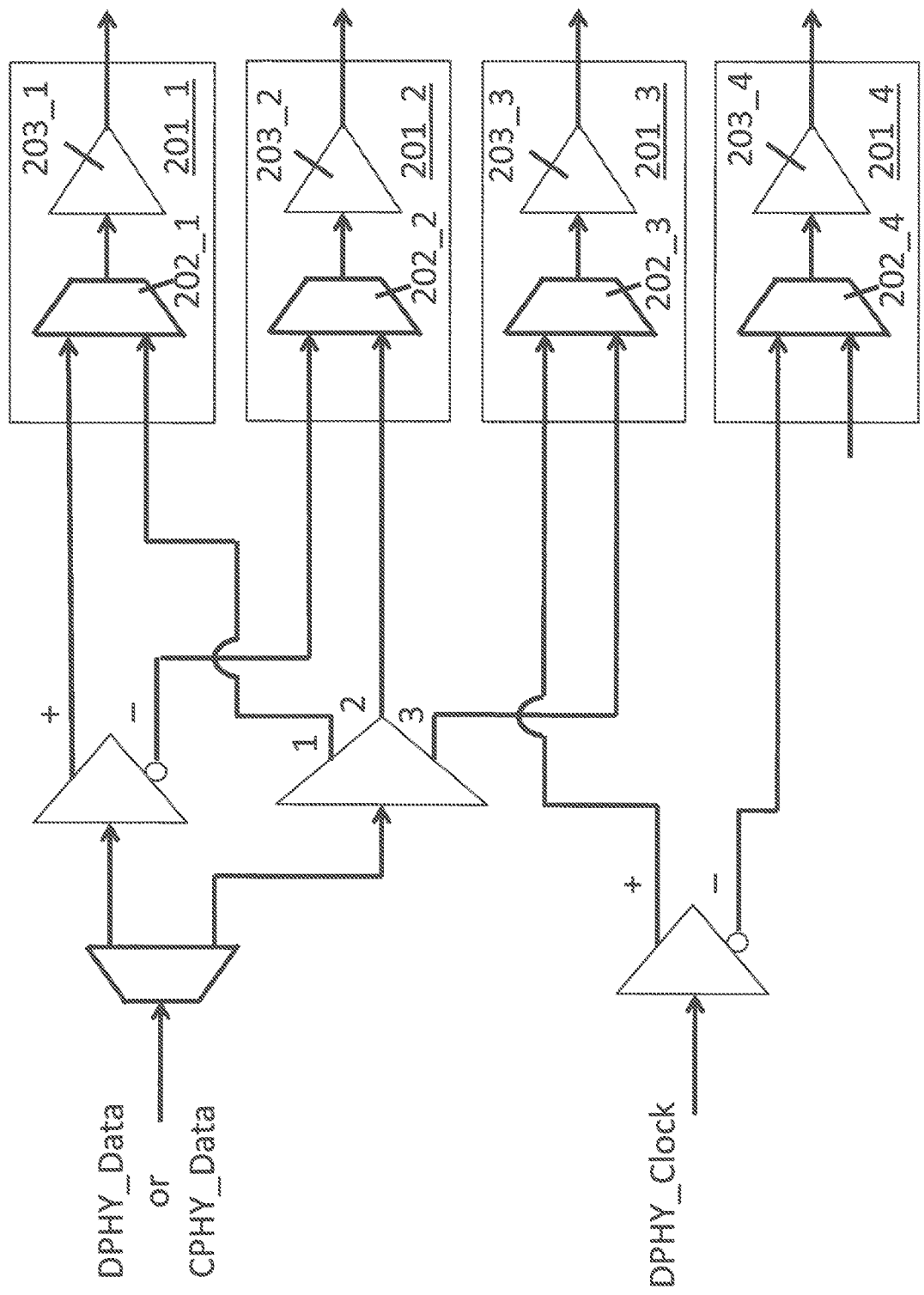
Figure 3A:
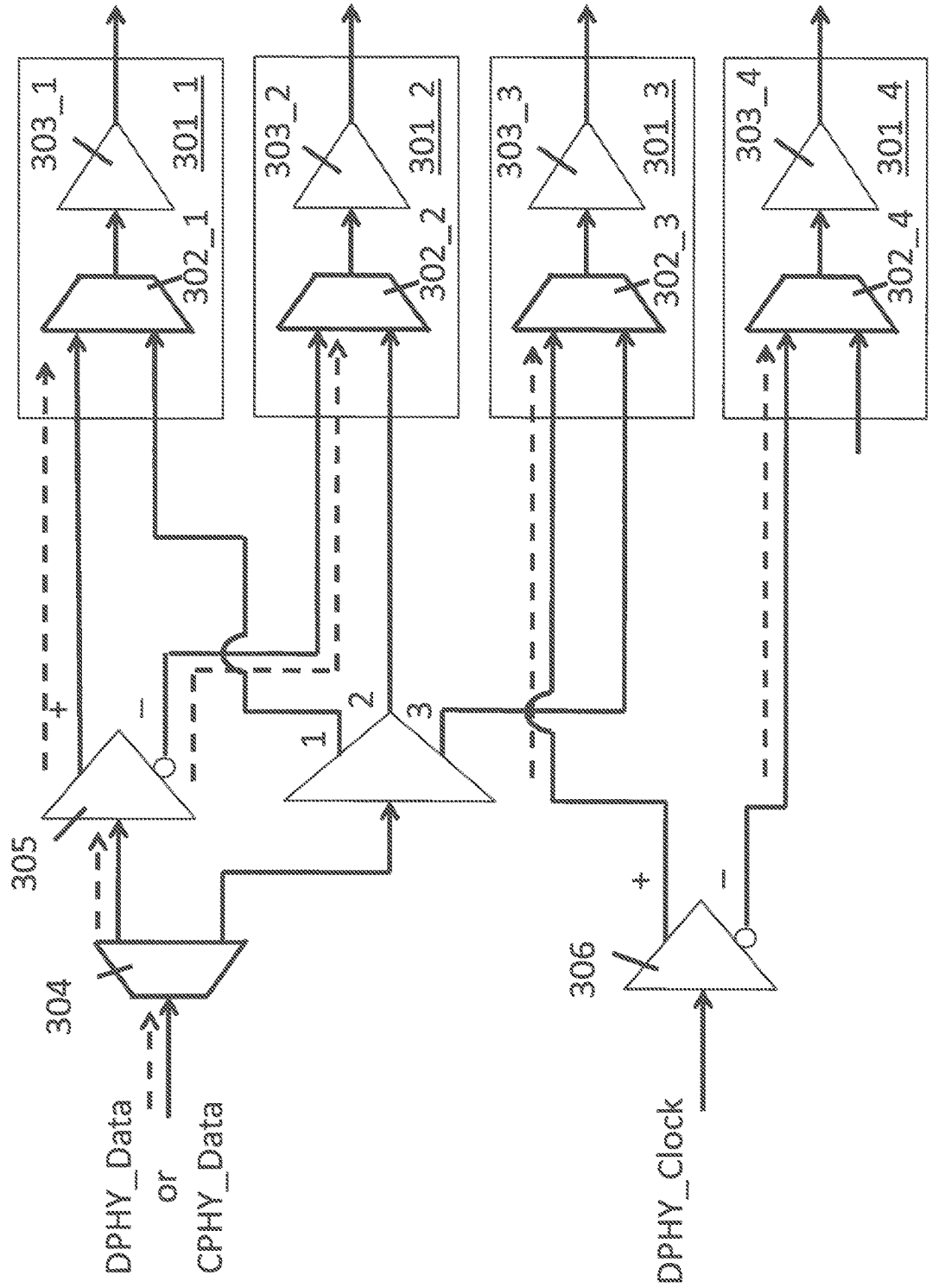
Figure 3B:
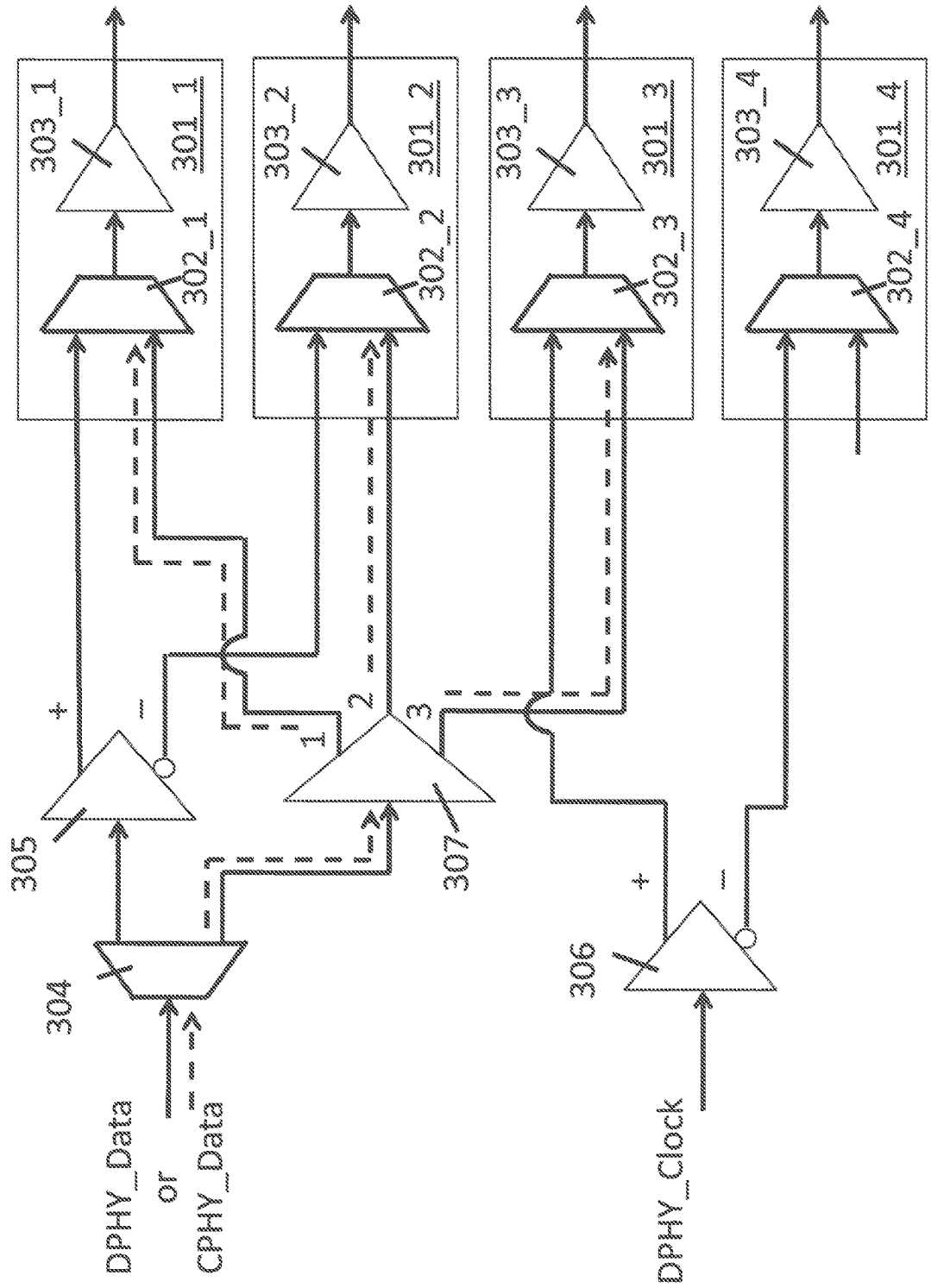
Figure 5:
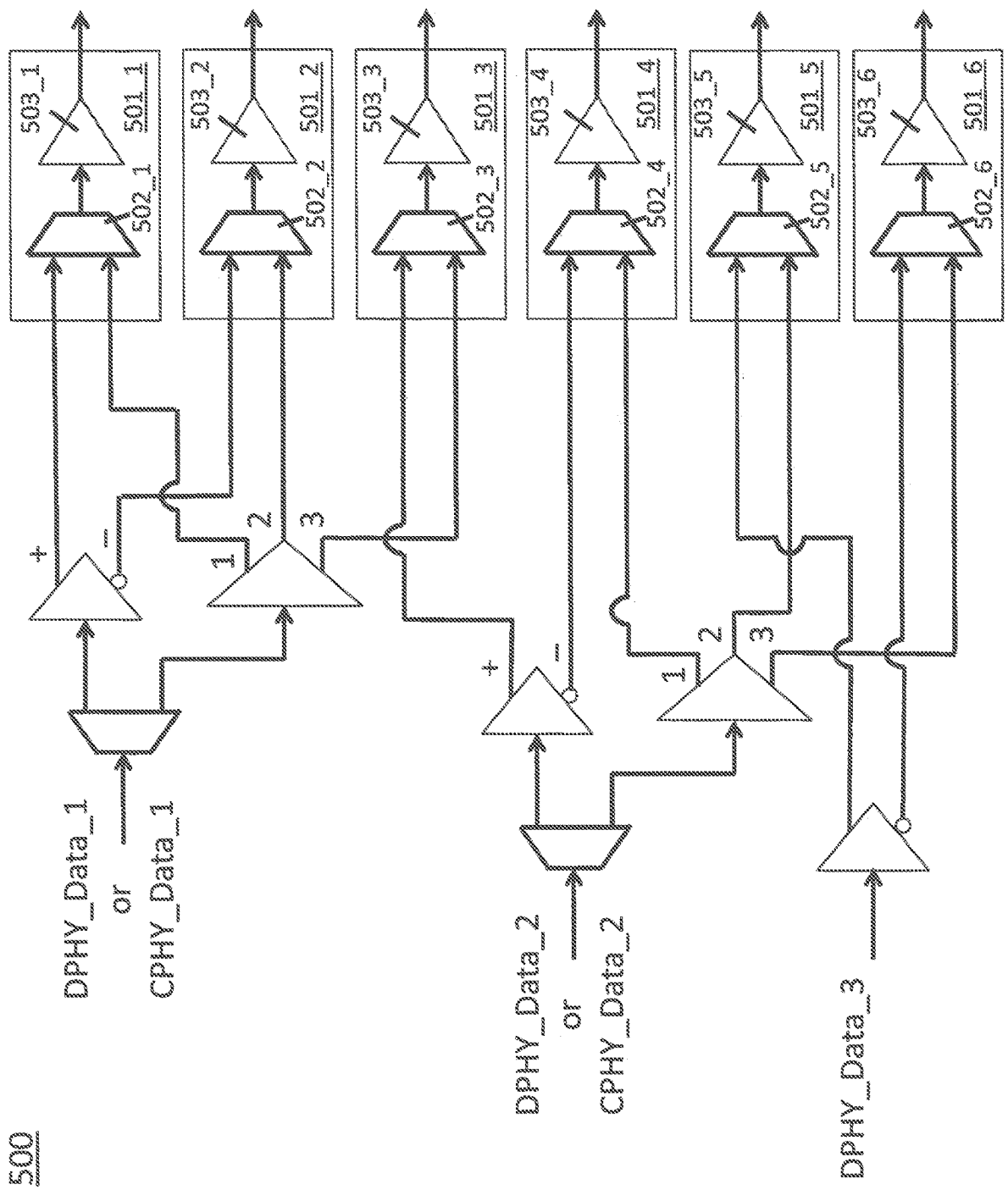
Figure 6:
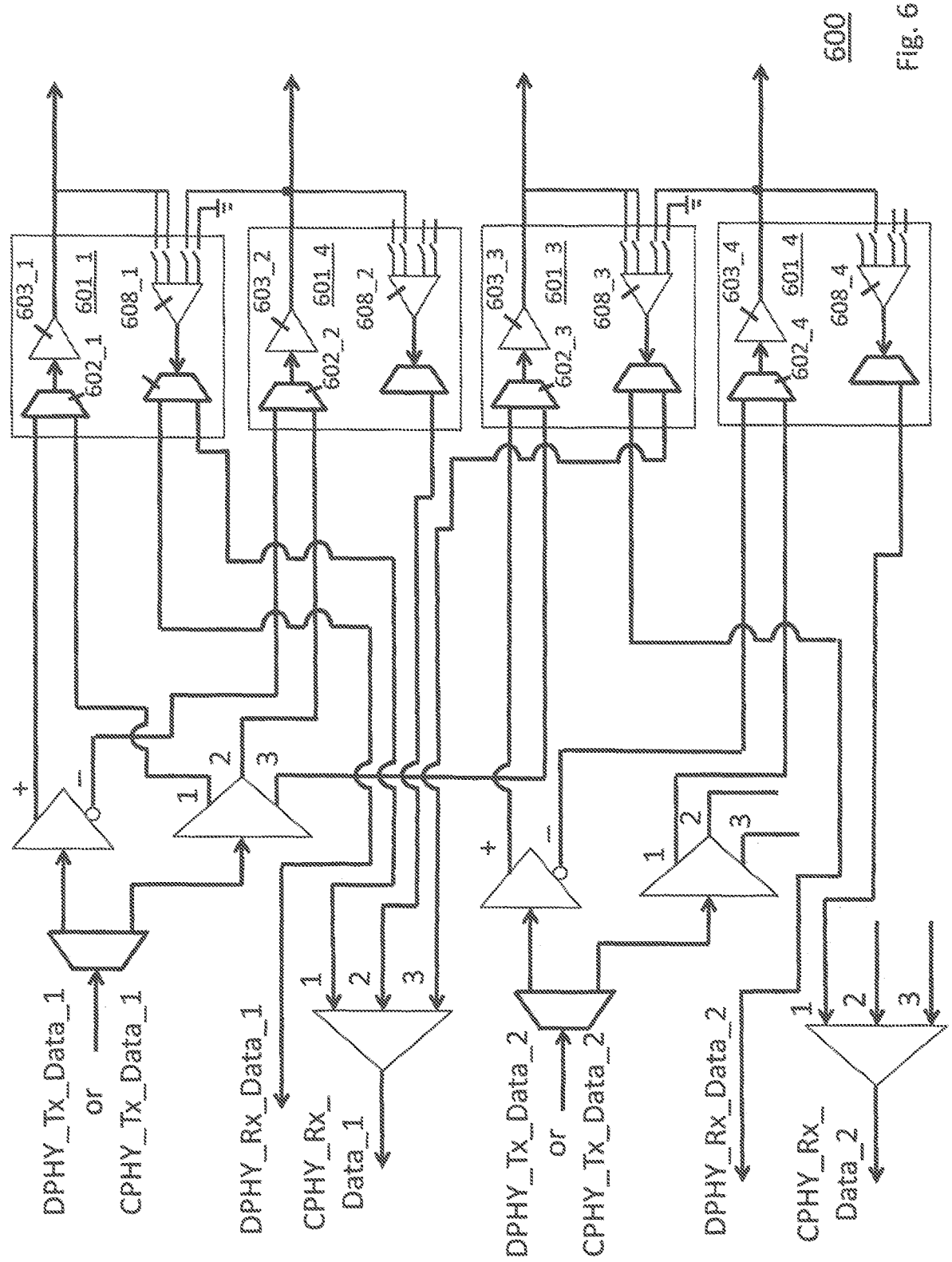
Figure 7A:
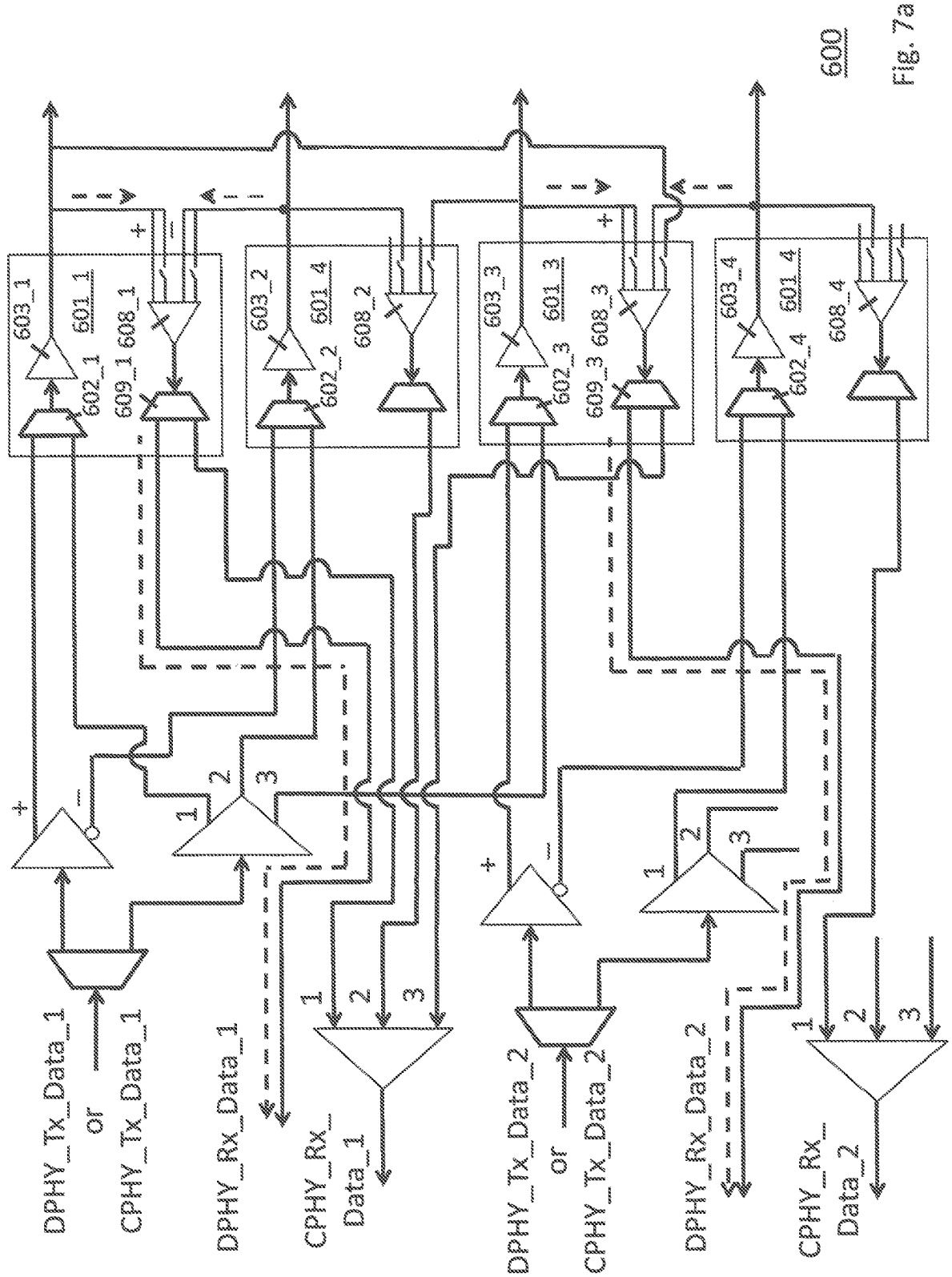
Figure 7B:
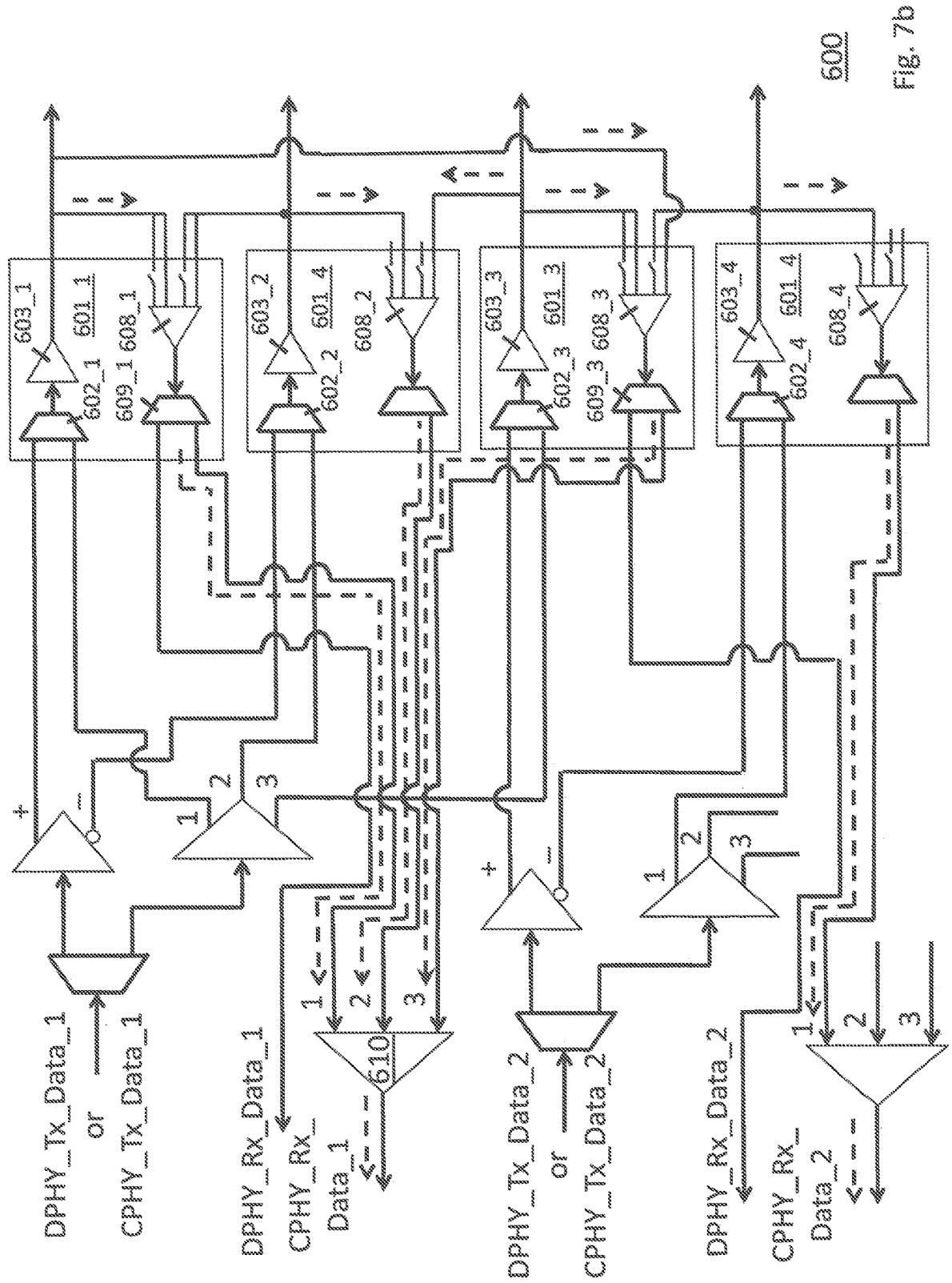
Figure 8:
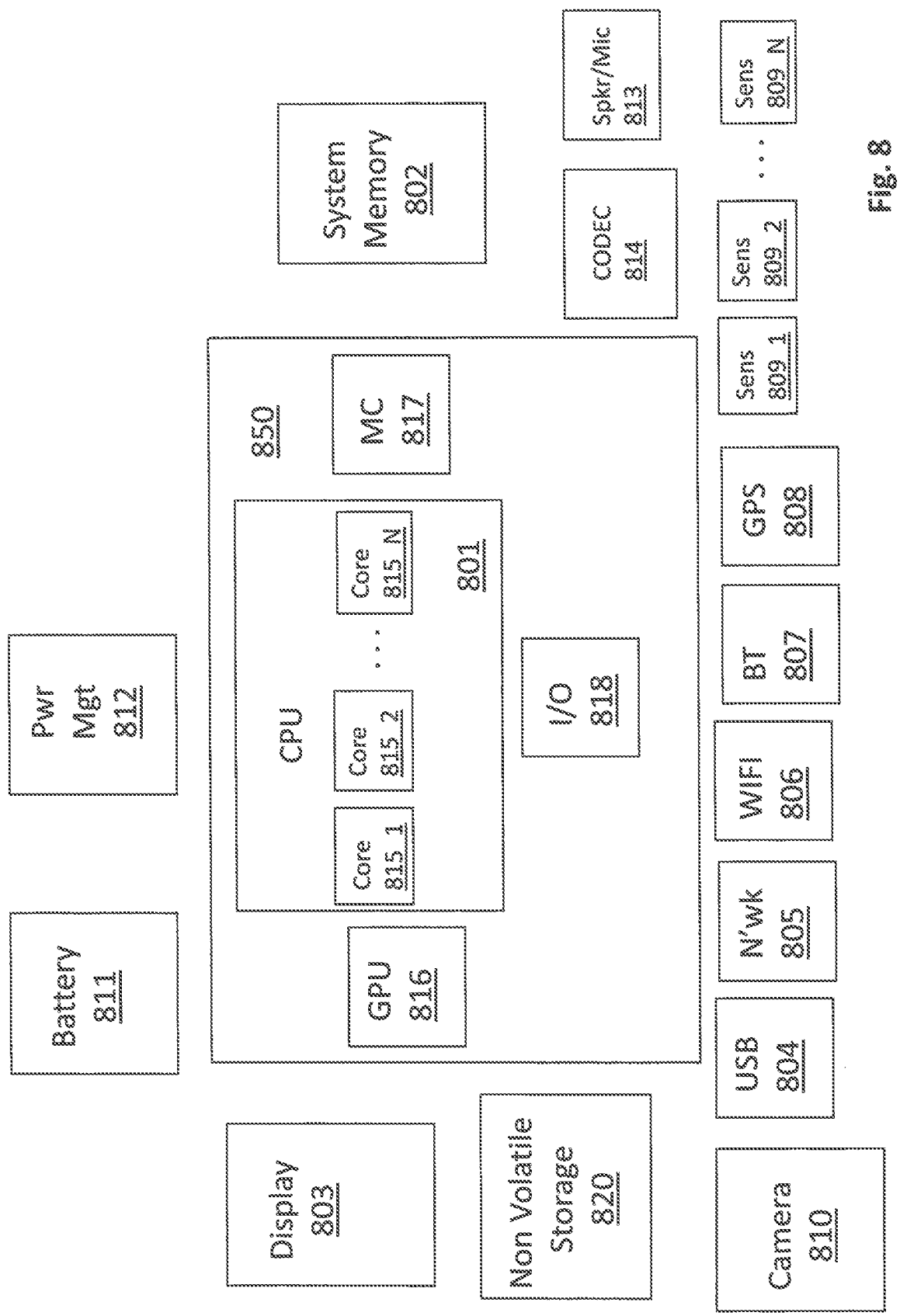

A better understanding of the present invention can be obtained from the following detailed description in conjunction with the following drawings, in which:

FIG. 1 shows a combined specification interface;
FIG. 2 shows an improved combined specification interface;
FIGS. 3a and 3b shows different states of the interface of FIG. 2;
FIG. 4 shows an embodiment of a modular transmitter circuit of the interface of FIG. 2;
FIG. 5 shows an embodiment of a combined interface that provides multiple instances of interfaces for first and second specifications;
FIG. 6 shows a combined specification interface that supports bi-directional data lines;
FIG. 7a shows a first state of the interface of FIG. 6;
FIG. 7b shows a second state of the interface of FIG. 6;
FIG. 8 shows a computing system.

DETAILED DESCRIPTION

FIG. 1 shows a basic analog electrical front end transmit interface 100 that is designed to support different types of physical layer specifications. For example, analog transmit interface 100 may be a MIPI CSI-2 compatible interface which, as specified, is supposed to be able to operate as either a MIPI DPHY transmit interface or a MIPI CPHY transmit interface. Because the transmit interface 100 is designed to support two different physical layer specifications, two different transmit channels 101, 102 are observed. A first transmit channel 101 supports a typical MIPI DPHY interface having a differential data output 103 and a differential clock output 104. A second transmit channel 102 supports a typical MIPI CPHY interface having three single ended outputs 105.

Here, as is known in the art, MIPI DPHY specifies separate differential data and clock transmissions. By contrast, MIPI CHPY specifies a "trio" of transmit data signals that consists of three single-ended signals having a particular phase and voltage level relationship amongst them. Whereas in the MIPI DPHY solution the receive side receives a clock directly from the transmit side, by contrast, in the MIPI CPHY solution the receive side is designed to extract a clock from the trio of data transmit signals.

Thus, with the significant differences that exist between the two solutions, the base interface 100 is essentially composed of two entirely different transmit channels 101, 102. The first DPHY channel 101 is enabled if MIPI DPHY signals are to be driven through the interface 100, while, the CPHY channel 102 is enabled if MIPI CPHY signals are to be driven through the interface 100. The separate and exclusive channel circuitry 101, 102 for both solutions corresponds to an inefficient design. In particular, separate output nodes are used for both channels 101, 102 which increases the complexity and form factor of the integrated interface's input/output (I/Os).

FIG. 2 shows an improved analog transmit interface 200 in which the circuitry includes multiple modularized, single ended transmitter circuits 201_1 through 201_4 that can be used for either the MIPI DPHY mode of operation or the MIPI CPHY mode of operation. Importantly, the output of a single ended transmitter circuit can be used to drive one end of a differential MIPI DPHY transmitted data or clock signal or one of the trio of MIPI CPHY output signals. Each modular transmitter 201_1 through 201_4 includes a front end ion circuit 202 to provide for selection of the different types of signals that the driver can drive and a driver circuit 203 to drive the signal through the single ended output.

FIG. 3a shows the configuration of the interface of FIG. 2 in MIPI DPHY mode and FIG. 3b shows the configuration of the interface of FIG. 2 in MIPI CPHY mode. Referring to the MIPI DPHY configuration of FIG. 3a, differential MIPI DPHY output drivers are effected for the data signals by coupling the + end of a MIPI DPHY output data signal to a first modular driver circuit 301_1 and the − end of the same MIPI DPHY output data signal to a second modular driver circuit 301_2. FIG. 3a shows the enabled channels in MIPI DPHY mode as dashed lines. Note that the driver component 303_1, 303_2 of both of the modular drivers 301_1, 301_2 effectively receive a MIPI DPHY signal via channel selection circuits 302_1, 302_2, respectively. Additionally, in MIPI DPHY mode, channel selection circuit 304 will forward an input data signal to differential driver 305 which provides the + and − data signals to channel select circuits 302_1 and 302_2, respectively.

Likewise, when configured in MIPI DPHY mode, both ends of the transmit clock signal are provided to channel select circuits 302_3 and 302_4 by differential driver 306. Both of channel select circuits 302_3 and 302_4 select the signal from differential driver 306 which causes the + end of the MIPI DPHY clock signal to be transmitted from modular driver 301_3 and the − end of the MIPI DPHY signal to be transmitted from modular driver 3014.

Thus, as observed in FIG. 3a, a complete DPHY output interface can be realized from four single ended modular driver circuits 301_1 through 301_4: a first pair 303_1, 303_2 to drive the differential data signal and the second pair 301_3, 301_4 to drive the differential clock signal.

By contrast, in MIPI CPHY mode, referring to FIG. 3b, three of the same modular driver circuits used to implement the MIPI DPHY output interface of FIG. 3a are also used to implement the MIPI CPHY output interface of FIG. 3b. Here, for instance, data channel select circuit 304 is configured in MIPI CPHY mode which forces the transmit data signal to a MIPI CPHY trio driver circuit 307 rather than the MIPI DPHY differential driver circuit 305 that is used in MIPI DPHY mode as described above with respect to FIG. 3a. The trio driver circuit 307 creates the trio of MIPI CPHY output signals. Each of the three different data output signals are directed to the respective front end channel select circuit 302_1, 302_2, 302_3 of three different single ended modular drivers 301_1, 301_2, 301_3. When in MIPI CPHY mode the front end channel select circuit 302_1, 302_2, 302_3 of each of the three modular circuits 303_1, 303_2, 303_3 selects the output from the trio driver 307 rather than the MIPI DPHY differential driver 305.

Thus, as is readily observed by comparing FIG. 1 with FIGS. 2, 3a and 3b, fewer output nodes are consumed by the approach of FIGS. 2, 3a and 3b than the approach of FIG. 1 resulting in a more efficient design from an output node count perspective. In an embodiment, each of the output nodes are coupled to a respective pad on a semiconductor die that are routed directly to an I/O connector (e.g., a solder bump or ball) of the semiconductor die.

As such, the improved approach of FIGS. 2, 3a and 3b help to alleviate any I/O density issues that may be associated with the semiconductor chip that the MIPI interface 200, 300 is integrated on. For example, if the MIPI interface 200, 300 is integrated on a large system-on-chip having, e.g., multiple processing cores, a system memory controller and a peripheral control hub, the improved MIPI interface 200, 300 described herein effectively "makes room" for other I/O connectors that might otherwise have difficulty being implemented.

FIG. 4 shows an embodiment 401 of a single ended modular transmitter. As observed in FIG. 4, transistors Q1 and Q2 correspond to the driver component of the modular transmitter and transistors Q3 and Q4 correspond to the front end selection circuit of the modular driver. Here, transistors Q1 and Q2 implement a standard "push-pull" driver circuit whereas transistors Q3 and Q4 implement a single throw switch that feeds a signal from either of inputs 411 and 412 to the input of the driver. If, for instance, the modular transmitter 401 is used for either of transmitters 302_1 or 302_2 of FIGS. 3a and 3b, one of inputs 411 is for the MIPI DPHY input and the other of the inputs 412 is for the MIPI CPHY input. As such, in MIPI DPHY mode transistor Q3 is on and transistor Q4 is off, while, in MIPI CPHY mode transistor Q4 is on and transistor Q3 is off.

Transistor Q5 couples a supply voltage to the driver. Here, different transmitted signals may have different transmitted voltage levels. For example, MIPI DPHY data and/or clock signals may have different voltage levels than the MIPI CPHY signals. Likewise, different MIPI CPHY trio signals may have different voltage levels amongst themselves. The surrounding interface circuitry that the modular transmitter 401 is a part of may therefore include supply voltage selection circuitry to provide the correct supply voltage for the particular mode that the interface is in. The correct voltage level may also need to be applied to the gates of the selection circuit transistors Q3 and Q4 and the signals that are received at inputs 411 and 412.

FIG. 5 shows a special arrangement 500 of the modular transmitter circuits that provide for three full scale MIPI DPHY data transmission lanes or two full scale MIPI CPHY data transmission lanes. Notably, only six pads are consumed to provide for the multi-standard, multi-lane solution. According to the design of FIG. 5, in MIPI DPHY mode, modular circuit pairs 503_1 and 503_2 are used to implement a first differential transmit data lane, modular circuit pairs 501_3 and 501_4 are used to implement a second differential transmit data lane, and modular circuit pairs 501_5 and 501_6 are used to implement a third differential transmit data lane. An additional six modular transmission circuits and corresponding additional 6 pads (not shown) can be added to the circuitry of FIG. 5 to provide for the differential clocking of the MIPI DPHY lanes.

By contrast, in MIPI CPHY mode, the trio of modular circuits 501_1, 501_2 and 501_3 are used to implement a first data transmit lane and the trio of modular circuits 501_4, 501_5 and 501_6 are used to implement a second data transmit lane. The aforementioned six additional (not shown) modular circuits used to form three differential clock transmission channels in MIPI DPHY mode can be used in MIPI CPHY mode to implement two more MIPI CPHY transmission lanes. As such, with only 12 pads being consumed, six full data and clock MIPI DPHY lanes can be realized in MIPI DPHY mode and four MIPI CPHY transmit lanes can be realized in MIPI CPHY mode.

Importantly, the design can simultaneously support two different modes. For example, modular circuits 503_1 and 503_2 can be placed in MIPI DPHY mode while modular circuits 503_4, 503_5 and 503_6 can be placed in MIPI CPHY mode (modular circuit 503_3 is not used).

In an alternate implementation, eight modular circuits that consume 8 pads are instantiated to provide for four MIPI DPHY data and clock lanes in MIPI DPHY mode or two MIPI CPHY lanes in MIPI CPHY mode (in MIPI CPHY mode, two of the modular transmit circuits are unused). In yet another implementation, nine modular transmit circuits that consume 9 pads are instantiated to provide for four MIPI DPHY data and clock lanes in MIPI DPHY mode (where one of the modular transmit circuits is unused) or three MIPI CPHY lanes in MIPI CPHY mode. These same arrangements can also simultaneously support MIPI DPHY and MIPI CPHY modes.

Various MIPI interface implementations also provide for a bi-directional data line. That is, data is not only transmitted from a particular node but is also received on the same node. FIG. 6 shows another MIPI DPHY/CPHY interface circuit 600 where the modular circuit not only includes a transmitter portion as described just above in the preceding figures but also includes a receiver portion to enable bi-directional data lines. Note that the transmit side of the embodiment 600 of FIG. 6 follows the same design approach as the interface embodiment 500 of FIG. 5.

As observed n FIG. 6, each modular circuit 601_1 through 601_4 includes a receiver circuit 608_1, 608_2, 608_3, 608_4 having a switching network before its inputs. FIGS. 7a and 7b respectively show the circuitry 600 of FIG. 6 enabled in MIPI DPHY mode (FIG. 7a) and MIPI CPHY mode (FIG. 7b).

In the MIPI DHPY mode arrangement in FIG. 7a, a set of switches are closed in a first position which causes alternate receiver circuits in the modular circuits to operate as a differential receiver. In the example of FIG. 7a, the receiver circuits 608_1 and 6083 of modular circuits 601_1 and 6013 act as differential receiver circuits to receive a differential MIPI DPHY receive signal. A respective channel select circuit 609_1 and 609_3 that is present at the output of the receivers 608_1 and 608_3 is configured in MIPI DPHY mode to present the output of the receivers 608_1, 608_3 along a respective MIPI DPHY data output path. FIG. 7a does not show the MIPI DPHY receive channel for ease of illustration. Alternatively, the second differential receive channel ("DPHY_Rx_Data_2") can be used to receive the clock for the first differential receive channel ("DPHY_Rx_Data_1").

By contrast, in the MIPI CPHY mode arrangement in FIG. 7b, the set of switches are closed in a second position which causes each of the receivers 608_1 through 608_4 to act as single ended receivers that each receive a trio signal. The output signals from receivers whose output signals are part of a same trio are directed by their respective channel select circuit 609_1 through 609_3 to a MIPI CPHY receiver that processes the trio of received signals into received data and extracted clock signals.

Note that in the embodiments of FIGS. 6, 7a, and 7b the transmit drivers are coupled to the same pads that the receivers are coupled to. In various embodiments the transmit drivers are designed to act as an appropriate termination when viewed from the perspective of a signal that is being received at the pad. That is, the termination circuitry can be reused for the transmission driver function or the receiver circuit function such that the transmission circuitry itself is the termination for the receiver circuitry. For example, when the receiver function is enabled and the transmission function is disabled, the transmit driver can be configured to behave as a "termination" circuit for a receiver circuit where, e.g., such termination is typically used in "high-speed" serial link applications for signal integrity reasons. Generally, a termination circuit can be implemented as a resistance and capacitive element for a receiver circuit. Some implementations of a receiver circuit and a transceiver circuit may have dedicated termination circuitry for each that are not shared in anyway. However, in a perhaps better approach, rather than replicate two copies of the termination circuitry: one for the transmission driver and one for the receiver, instead, one instance of termination circuitry that is implemented as part of the transmission function is used as the termination circuitry for the receiver when the transmission driver is not enabled to drive on the "channel" or link at the same time as the receiver is enabled to receive information.

FIGS. 6, 7*a* and 7*b* only show two complete differential MIPI DPHY receive channels and one complete MIPI CPHY trio channel. However the pattern of FIGS. 6, 7*a* and 7*b* can be repeated to form more complete differential MIPI DPHY channels and more complete MIPI CPHY trio channels.

FIG. 8 shows a depiction of an exemplary computing system 800 such as a personal computing system (e.g., desktop or laptop) or a mobile or handheld computing system such as a tablet device or smartphone, or, a larger computing system such as a server computing system. The computing system may contain a combined MIPI DPHY/CPHY interface solution as described above.

As observed in FIG. 8, the basic computing system may include a central processing unit 801 (which may include, e.g., a plurality of general purpose processing cores and a main memory controller disposed on an applications processor or multi-core processor), system memory 802, a display 803 (e.g., touchscreen, flat-panel), a local wired point-to-point link (e.g., USB) interface 804, various network I/O functions 805 (such as an Ethernet interface and/or cellular modem subsystem), a wireless local area network (e.g., WiFi) interface 806, a wireless point-to-point link (e.g., Bluetooth) interface 807 and a Global Positioning System interface 808, various sensors 809_1 through 809_N (e.g., one or more of a gyroscope, an accelerometer, a magnetometer, a temperature sensor, a pressure sensor, a humidity sensor, etc.), a camera 810, a battery 811, a power management control unit 812, a speaker and microphone 813 and an audio coder/decoder 814.

An applications processor or multi-core processor 850 may include one or more general purpose processing cores 815 within its CPU 801, one or more graphical processing units 816, a memory management function 817 (e.g., a memory controller) and an I/O control function 818. The I/O control function 818 (e.g., an I/O control hub or a peripheral hub) may include an embodiment of the aforementioned combined MIPI DPHY/CPHY interface to, e.g., communicate with one or more cameras 810 (through MIPI CPHY) as well as one or more other peripherals 804 through 809.

The general purpose processing cores 815 typically execute the operating system and application software of the computing system. The graphics processing units 816 typically execute graphics intensive functions to, e.g., generate graphics information that is presented on the display 803. The memory control function 817 interfaces with the system memory 802. The system memory 802 may be a multi-level system memory.

Each of the touchscreen display 803, the communication interfaces 804-807, the GPS interface 808, the sensors 809, the camera 810, and the speaker/microphone codec 813, 814 all can be viewed as various forms of I/O (input and/or output) relative to the overall computing system including, where appropriate, an integrated peripheral device as well (e.g., the camera 810). Depending on implementation, various ones of these I/O components may be integrated on the applications processor/multi-core processor 850 or may be located off the die or outside the package of the applications processor/multi-core processor 850.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
    an electrical interface that supports a first physical layer specification and a second physical layer specification, said first physical layer specification specifying differentially transmitted data and a differentially transmitted clock, said second physical layer specification specifying first, second and third transmitted data signals, said electrical interface comprising a plurality of modular transmitter circuits, each of the modular transmitter circuits comprising a single ended driver and a select circuit, said select circuit to select either one end of a differential signal associated with said first physical layer specification or one of said at least three transmitted data signals associated with said second physical layer specification so that said electrical interface is able to provide respective outputs for said differentially transmitted data, said differentially transmitted clock and said first, second and third transmitted data signals with less than seven outputs.

2. The apparatus of claim 1 wherein said first physical layer specification is MIPI DPHY and said second physical layer specification is MIPI CPHY.

3. The apparatus of claim 1 wherein said first, second and third transmitted data signals comprise different voltage levels and/or phase relationships amongst one another.

4. The apparatus of claim 1 wherein a first group of said modular transmitter circuits are to transmit an end of said differentially transmitted data associated with said first physical layer specification and a second group of said modular transmitter circuits are to transmit an end of said differentially transmitted clock associated with said first physical layer specification.

5. The apparatus of claim 1 wherein said modular transmitter circuits comprise receiver circuitry to enable bi-directional data lines.

6. The apparatus of claim 5 wherein said electrical interface further comprises a switching network having a first state to provide a differential receive signal to respective receivers of certain ones of said modular transmitter circuits.

7. The apparatus of claim 6 wherein said switching network has a second state to provide single ended ones of said at least three transmitted data signals to different ones of said modular transmitter circuits.

8. An apparatus, comprising:
a plurality of processors;
a memory controller coupled to said plurality of processors;
a system memory coupled to said memory controller;
I/O control logic circuitry coupled to said memory controller, said I/O control logic circuitry including an electrical interface that supports a first physical layer specification and a second physical layer specification, said first physical layer specification specifying differentially transmitted data and a differentially transmitted clock, said second physical layer specification specifying first, second and third transmitted data signals, said electrical interface comprising a plurality of modular transmitter circuits, each of the modular transmitter circuits comprising a single ended driver and a select circuit, said select circuit to select either one end of a differential signal associated with said first physical layer specification or one of said at least three transmitted data signals associated with said second physical layer specification so that said electrical interface is able to provide respective outputs for said differentially transmitted data, said differentially transmitted clock and said first, second and third transmitted data signals with less than seven outputs.

9. The apparatus of claim 8 wherein said first physical layer specification is MIPI DPHY and said second physical layer specification is MIPI CPHY.

10. The apparatus of claim 8 wherein said first, second and third transmitted data signals comprise different voltage levels and/or phase relationships amongst one another.

11. The apparatus of claim 8 wherein a first group of said modular transmitter circuits are to transmit an end of said differentially transmitted data associated with said first physical layer specification and a second group of said modular transmitter circuits are to transmit an end of said differentially transmitted clock associated with said first physical layer specification.

12. The apparatus of claim 8 wherein said modular transmitter circuits comprise receiver circuitry to enable bi-directional data lines.

13. The apparatus of claim 12 wherein said interface circuit further comprises a switching network having a first state to provide a differential receive signal to respective receivers of certain ones of said modular transmitter circuits.

14. The apparatus of claim 13 wherein said switching network has a second state to provide single ended ones of said first, second and third transmitted data signals to different ones of said modular transmitter circuits.

15. An apparatus, comprising:
an electrical interface that supports a first physical layer specification and a second physical layer specification, said first physical layer specification specifying differentially transmitted data and a differentially transmitted clock, said second physical layer specification specifying first, second and third transmitted data signals, said electrical interface comprising a plurality of modular transmitter circuits, each of the modular transmitter circuits comprising a single ended driver and a select circuit, said select circuit to select either one signal associated with said first physical layer specification or one signal associated with said second physical layer specification, wherein, said electrical interface provides multiple instances of interfaces for both said first physical layer specification and said second physical layer specification so that said electrical interface is able to provide respective outputs for said differentially transmitted data, said differentially transmitted clock and said first, second and third transmitted data signals with less than seven outputs.

16. The apparatus of claim 15 wherein said first physical layer specification is MIPI DPHY and said second physical layer specification is MIPI CPHY.

17. The apparatus of claim 15 wherein said first, second and third transmitted data signals comprise different voltage levels and/or phase relationships amongst one another.

18. The apparatus of claim 15 wherein a first group of said modular transmitter circuits are to transmit an end of said differentially transmitted data associated with said first physical layer specification and a second group of said modular transmitter circuits are to transmit an end of said differentially transmitted clock associated with said first physical layer specification.

19. The apparatus of claim 15 wherein said modular transmitter circuits comprise receiver circuitry to enable bi-directional data lines.

20. The apparatus of claim 19 further comprising a switching network that has a first state to provide a differential receive signal to respective receivers of certain ones of said modular transmitter circuits and wherein said switching network has a second state to provide single ended ones of said first, second and third transmitted data signals to different ones of said modular transmitter circuits.

* * * * *